United States Patent
Doyle

[15] 3,675,017
[45] July 4, 1972

[54] SHIELDED PYROELECTRIC DETECTOR APPARATUS AND METHOD

[72] Inventor: Walter M. Doyle, 5 Arnold Avenue, Utica, N.Y. 13502

[22] Filed: Aug. 10, 1970

[21] Appl. No.: 62,286

[52] U.S. Cl. .....................250/83.3 H, 73/362 CP, 250/83 R
[51] Int. Cl. ..................................................G01j 5/02
[58] Field of Search ................250/83.3 H, 83 R; 73/362 CP; 174/103

[56] References Cited

UNITED STATES PATENTS 3,539,803 11/1970 Beerman.......................250/83.3 H X
711,414 10/1902 Borel................................174/103 X

*Primary Examiner*—Archie R. Borchelt
*Attorney*—Robert A. Benziger

[57] ABSTRACT

A method and apparatus for providing a pyroelectric detector with stray capacitance reducing shielding is disclosed herein. In order to minimize stray capacitance of the detector, the housing of the detector is coupled to the output of the detector output signal amplifier through a suitable feedback network to maintain the housing at output signal potential. The capacitive impedance between the housing and the various electrical leads is then apparently infinite.

9 Claims, 4 Drawing Figures

PATENTED JUL 4 1972  3,675,017

INVENTOR.
WALTER M. DOYLE
BY Robert A. Benziger
ATTORNEY

SHIELDED PYROELECTRIC DETECTOR APPARATUS AND METHOD

BACKGROUND OF THE INVENTION

1. Field of the Invention

The present invention relates to the field of energy detectors in general and particularly to the field of infrared radiation detectors of the type termed pyroelectric detectors (i.e., the type which utilize pyroelectric materials as the detector element).

2. Description of the Prior Art

The pyroelectric detector is a thermal sensor of infrared radiation, which employs as the detector element a material which exhibits the pyroelectric effect. While, in theory, the pyroelectric detectors are noiseless since they are in principle pure capacitors, the pyroelectric detectors fabricated in accord with the teachings of the prior art have varying noise contributions as a function of frequency due to associated electrical components. Noise, in this context is intended to mean electrical noise (extraneous electrical signals imposed on or added to the output signal of the detector).

The actual sensor is usually a pyroelectric crystal exhibiting spontaneous polarization (i.e., alignment of electric dipoles within domains of the crystal). Both the spontaneous polarization and the dielectric constant of the crystal are temperature-dependent. A change in incident power raises the detector temperature causing an electric charge to appear across the electroded surfaces which are cut perpendicular to the crystal's ferroelectric axis. Under open circuit conditions, a voltage is obtained which is ultimately neutralized by current flow through the leakage resistance or load resistor.

The operation of a pyroelectric detector is given by the expression $$r = \frac{V}{W} = \frac{k_1 R \lambda \omega}{(1 - \omega^2 R^2 C^2)^{1/2} (1 - \omega^2 k_2)^{1/2}} \quad (1)$$

where $r$ is the detector responsivity (Volts out per Watt), $R$ is the parallel resistance, $\omega$ is the angular frequency ($2\pi f$) of the light modulation, $C$ is the total capacitance, $\lambda$ is the pyroelectric coefficient, and $k_1$ and $k_2$ are constants.

One usually wants to operate at a modulation frequency high compared to the various reciprocal time constants involved. In this case Eq. (1) simplifies to $$r = k_3 \lambda / C \omega$$

where $k_3 \lambda = k_1 / k_2$ (2)

Now the capacitance $C$ will usually be the sum of the detector capacitance and any stray capacitance: $C = C_d + C_s$. Furthermore, the preferred geometry for a pyroelectric detector is one where the detector is in the form of a very thin rectangular slice with electrodes on the edges. Thus, for most situations $C_d$ will be very small (less than a picofarad) and stray capacitance will dominate.

The problem with the practical use of a pyroelectric detector arises from the fact that $\lambda$(pyroelectric coefficient) is a very profound function of temperature which is large in the vicinity of a temperature termed the Curie point and which falls rapidly as the temperature deviates from the Curie point. (The Curie point is a characteristic of the particular crystalline material used.) In fact, the $\lambda$ function is zero above the Curie point in the absence of an applied electromagnetic field. Thus, in order to obtain the desired high output from a detector dominated by stray capacitance, it has been necessary to hold the detector temperature very close to, and preferably at, the Curie point. On the otherhand, if the detector capacitance dominates, it will be seen from Eq. (2) above that the detector responsivity will become substantially less temperature dependent. This occurs because the detector capacitance is proportional to the dielectric constant which in turn is inversely proportional to $\lambda$. It is, therefore, an object of the present invention to provide a pyroelectric infrared detector in which the detector capacitance dominates and the stray capacitance is considerably smaller. It is a further object of the present invention to provide a detector of the above described character which is substantially less temperature dependent than similar detectors fabricated in accord with the teachings of the prior art.

One approach to solving the above noted problem has involved building a high impedance FET amplifier into the detector package, spaced as closely as possible to the detector crystal, so as to permit the shortest possible input leads. This has resulted in a complex packaging problem which requires expensive and time consuming techniques and does not completely solve the problem as the short remaining leads tend to add (albeit reduced) stray capacitance to the system. It is, therefore, an object of the present invention to provide a pyroelectric infrared detector having a minimum stray capacitance and which is simpler to construct than similar prior art detectors.

SUMMARY OF THE PRESENT INVENTION

The present invention contemplates shielding the output electrical leads within a conductive shielding member and electrically biasing the shielding member so that the effective impedance of the stray capacitance is very large (i.e., approaching infinity). The length of the electrical leads within the shielding is kept at a minimum consistent with efficient, noncomplex manufacturing techniques. The shielding member is biased by suitable feedback from the output of the signal amplifier so as to render the shielding means at the same electrical potential as the input lead but at a much lower impedance to ground. In addition, the detector crystal may be placed in intimate electrical energy conducting contact, along one face thereof, with the shielding means so as to reduce the effective capacitance of the detector itself, except for those regions most remote from the shielding means. In the case of an amplifier having a voltage gain of approximately unity, the feedback means could comprise a resistor or a capacitor as long as the amplifier has a high ratio (several orders of magnitude) of input impedance to output impedance.

DETAILED DESCRIPTION OF THE PREFERRED EMBODIMENT

Figure 1:
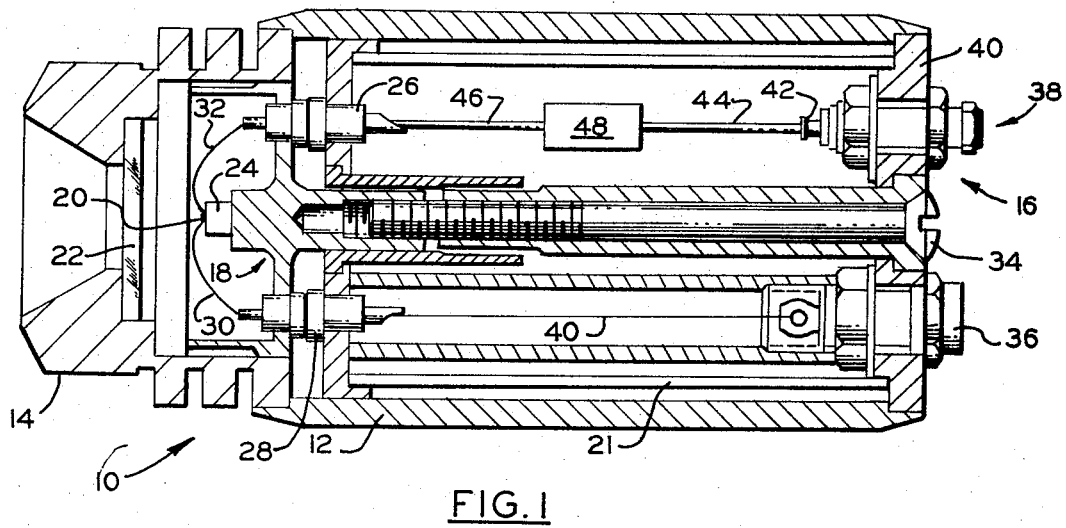
FIG. 1 shows a sectional view of a detector constructed according to the present invention with a circuit block representing a portion of the electrical circuit of my detector.

Referring now to FIG. 1, my detector is indicated generally by the number 10. The detector 10 is comprised of a body portion 12, a radiation receiving portion 14, electrical terminal means indicated generally by 16, crystal mounting means 18 and crystal 20. The crystal 20 is selected from the class of crystalline or polycrystalline materials which materials exhibit the pyroelectric effect. Materials in this class can be electrically polarized, and such materials exhibit temperature-dependent charge effects which can be read out by high impedance voltage sensitive devices. A number of materials are known to exhibit the pyroelectric effect. Although $KTa_xNb_{1-x}O_3$ (KTN) is preferred for use in the pyroelectric detector of this invention, single crystal or polycrystalline samples of materials such as triglycene sulphate, barium titanate, Rochelle salt, lithium sulphate, lithium tantalate, strontium barium niobate, or others which exhibit the pyroelectric effect may also be utilized. The particular type of pyroelectric material used will be determined by the environment and operating requirements of the particular application in which the detector is employed.

Window 22 is mounted within the radiation receiving portion 10 and crystal 20 is mounted on insulating substrate 24 which is a portion of the crystal mounting means 18. Crystal mounting means 18 engage the radiation receiving means 14. A pair of electrical terminals 26 and 28 pass through, and are electrically insulated from, crystal mounting means so as to have one portion of each terminal in proximity to crystal 20. The terminals 26 and 28 are connected to crystal 20 by a pair of conducting members 30 and 32. Crystal receiving means 18 threadedly receive screw 34 which interconnects a portion of electrical terminal means 16 with crystal receiving means 18. Body portion 12 is compressively confined therebetween to define an integral detector 10. With the exceptions of crystal 20, window 22 and substrate 24, the major portions of my inventive detector are of an electrically conductive material, such as aluminum, which readily lends itself to manufacturing techniques.

Electrical terminal means 16 include a plurality of electrical terminal members 36 and 38. Terminal member 36 is connected to terminal 28 by any suitable low impedance electrical means shown as wire 40. Terminal 38 is a co-axial type terminal of well-known construction having at least two independent and electrically-isolated electrical energy current paths therethrough. The first of these paths passes through base portion 40 and terminals at central connector 42. Central connector 42 is connected via wires 44, 46 and suitable electrical bias means 48, to be more fully described hereinbelow, to terminal 26. The second current path terminates at base 40 and is operative to couple electrical energy directly to the body portions, among them base portion 40 and body 12.

Figure 2:
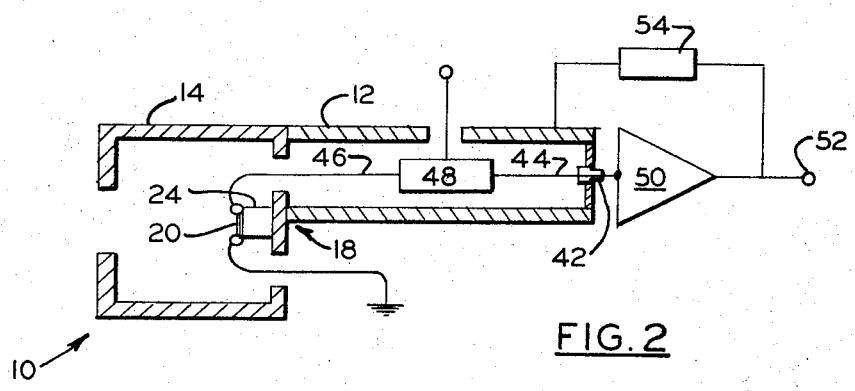
FIG. 2 shows a schematic of the detector of FIG. 1 with an electrical schematic and block diagram to illustrate the electrical circuit portion of my detector.

Referring now to FIG. 2, the electrical and other structural interrelationships of my detector are illustrated by a simplified drawing including an electrical block diagram. Crystal 20 is mounted on substrate 24 within radiation receiving portion 14. Crystal 20 is electrically connected via electrical bias means 48 to terminal 42. Terminal 42 is electrically connected to amplifier 50 which will provide the usable signal indicative of incident radiation at output port 52. Amplifier 50 is preferably an amplifier having a voltage gain of unity or slightly less and a ratio of input impedance to output impedance of several orders of magnitude. In devices of this general type constructed and operated in accord with the teachings of the prior art, the output signal derived at port 52 was greatly influenced by the capacitance between the body portion 12 and leads 46 and 44 and between the leads attached to crystal 20 and the radiation receiving portion 14. Feedback means 54 are provided to couple the output port 52 to the conductive body portion 12 to thereby electrically bias the body portion 12, and those electrically conductive body portions in contact therewith such as radiation receiving means 14, so as to minimize the stray capacitance between the various electrical leads and the body portions. Thus, the impedance between the leads 32, 46, 44 and body portions 12 and 14 will appear to be infinite. Feedback means 54 may comprise a suitable capacitance, inductance, or resistance, or combinations thereof. For instance, in one embodiment of my invention, a capacitor having a capacitance on the order of 1,000 pf coupled output port 52 to the conductive body portion 12 and significantly reduced the effects of stray capacitance in a pyroelectric detector of the type described thereby permitting detector capacitance, $C_d$, to dominate and rendering the detector relatively independent of temperature.

Figures 3, 4:
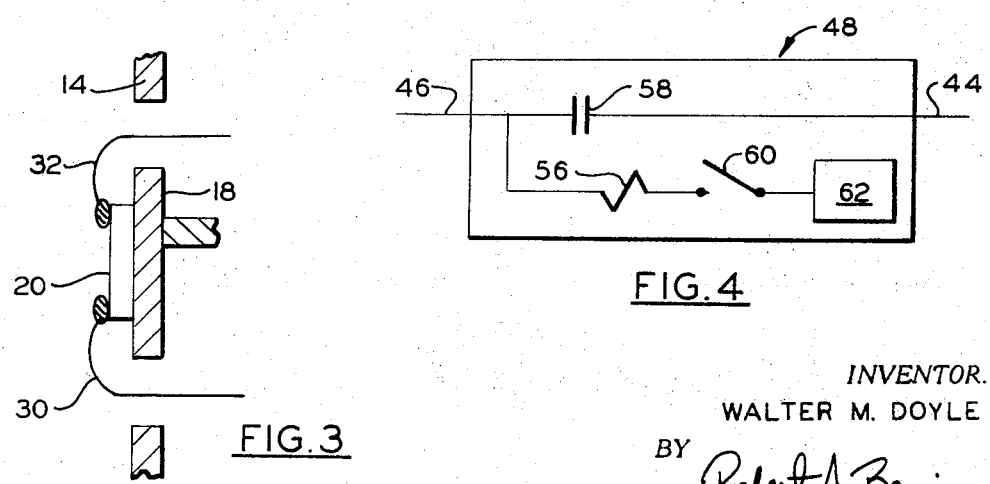
FIG. 3 shows an alternate embodiment for mounting the infrared detector crystal employed in a detector according to my invention.
FIG. 4 shows an electrical schematic of a portion of the electrical circuit used to control the electrical bias for the detector of the present invention.

Referring now to FIG. 3, an alternative method of mounting crystal 20 to crystal mounting means 18 is shown. This method involves causing crystal 20 to adhere directly to mounting means 18 without use of substrate 20. This may be achieved by use of electrically conductive epoxy, an indium seal or any other suitable means which will provide structural adhesion while providing the electrical continuity between crystal 20 and mounting means 18. This form of mounting the crystal 20 is preferred if the frequency of crystal modulation is in excess of 10 Hz since it has been determined that at modulation frequencies above the level, only the crystal capacitance across the exposed crystal face is significant while the remainder of the crystal tends to contribute to the stray capacitance. By placing the crystal in direct contact with the biased mounting means 18, those crystal dipoles remote from the region of the exposed crystal face will be neutralized.

Referring now to FIG. 4, the electrical bias means 48 is illustrated in an electrical schematic. Electrical lead 46 connects the electrical bias means 48 to the crystal 20 while electrical lead 44 connects the bias means 48 to the output amplifier 50. The electrical bias means illustrated here is used to electrically bias crystal 20 to thereby electrically align the dipoles thereof. Thus resistor 56 is connected to the crystal side of capacitor 58 and is connected via switch 60 to electrical supply 62. Both switch 60 and supply 62 may be located externally of body 12, as may resistance 56. However, it is preferred that only the supply be externally mounted so that the electrical leads, switch contacts, and elements 56 and 58 are within the influence of the electrical shielding provided by feedback 54. For the purposes of example, the value of resistance 56 need be great enough to maintain d.c. current levels within crystal 20 very low and consequently capacitor 58 need only be large enough to block d.c. bias from reaching the amplifier 50.

OPERATION

The operation of pyroelectric detectors is well known and will, therefore, be only briefly described herein. Crystal 20 is "poled" (i.e., the dipoles are aligned) by passing a d.c. signal from source 62 through switch 60, resistor 56, lead 46 the crystal 20 and thence to ground via lead 30. This signal may then be removed. A change in the energy incident upon the exposed face of the crystal will give rise to an electrical potential across the exposed face. By measuring the voltage, the incident energy change may be measured. Since the electrical potential is developed across a capacitor load, the measuring is preferably obtained by signal amplification through a high impedance, amplifier 50. However, the prior art devices were subject to an increment of error due to the capacitive coupling between the various signal carrying leads between the crystal 20 and the input to the amplifier 50. By employing my detector, the effects of this "stray capacitance" are greatly reduced. I have found that by providing an electrically conductive detector housing structure comprised of body portion 12, radiation receiving portion 14, shielding member 21 and base portion 40 and by electrically driving this structure at voltage equal to the detector crystal signal voltage, the stray capacitance will be reduced to a negligible value. Thus, feedback means 54 which couples the relatively higher output signal of the amplifier 50 to the housing structure may be a capacitor, or a high or low value resistance and accomplish the necessary voltage control function. Since, for all practical purposes, the entire detector structure will be at the same potential, except for the crystal face and the ground leads, there will be no tendancy for the stray capacitance to develop. In addition, mounting crystal 20 directly to mounting means 18 will cause the noncontributory portions of crystal 20 to be at the signal voltage thereby preventing this from being a source of stray capacitance.

The man of ordinary skill in the art will recognize that many modifications and variations may be made in the detector according to my invention without departing from the inventive concept. For instance, the electrodes may be connected to the detector material 20 on opposed surfaces as well as opposed edges, the detector body portions may be constructed of different conductive materials and in different configurations and relationships.

We claim:

1. In a radiation detector of the type comprising a detector material which exhibits the pyroelectric effect arranged within an electrically conductive housing to receive incident radiation and to provide a relatively low strength electrical signal indicative of the incident radiation and having electrical amplifier means for receiving the relatively low strength signal and providing as output a relatively high strength signal, the improvement comprising circuit means electrically interconnecting the amplifier output with the housing operative to electrically bias the housing to substantially the same potential as the relatively low strength signal.

2. The detector as claimed in claim 1 wherein said amplifier provides substantially unity voltage gain and said electrical circuit means comprise a passive electrical element operative to bias the housing to substantially the same voltage as is produced across the detector material by the incident radiation.

3. The detector as claimed in claim 1 wherein said amplifier is a unity voltage gain amplifier and said electrical circuit means comprise a very low impedance electrical interconnection between the output of said amplifier and the housing.

4. The detector as claimed in claim 1 wherein the housing is electrically coupled to a portion of the detector material and said circuit means is further operative to electrically bias at least a portion of the detector material to the same potential as the radiation indicating signal.

5. A radiation detector comprising:
   a body of material which exhibits the pyroelectric effect;
   electrically conductive housing means having an interior and an exterior;
   receiving means within said housing means;
   said body of material mounted on said receiving means and arranged to receive radiation;
   electrical means interconnecting said body and a point exterior of said housing means and electrically insulated therefrom;
   said body operative upon receipt of radiation to provide an electrical signal to the exterior point; and
   means responsive to the exterior point electrical signal to establish a comparable signal on said housing means.

6. The detector as claimed in claim 5 wherein said responsive means comprise:
   amplifier means operative to receive the exterior point electrical signal and to produce an output signal of increased strength; and
   electrical circuit means operative to couple the output signal to said housing means.

7. The detector as claimed in claim 6 wherein said amplifier is a unity voltage gain amplifier and said electrical circuit means comprise electrically passive circuit elements.

8. The detector as claimed in claim 6 wherein said electrical circuit means comprise electrically passive circuit elements operative to bias said housing means to the same electrical potential as is produced across said body by received radiation.

9. The method of providing stray capacitance reducing shielding to a pyroelectric detector comprising the steps of:
   providing the pyroelectric material with an electrically conductive housing;
   detecting the voltage generated across the pyroelectric material by radiation received thereby;
   amplifying the strength of the detected voltage; and
   biasing the housing to an electrical potential which is substantially identical with the detected voltage.

* * * * *